May 22, 1934. M. SAN NYUN 1,959,738
APPARATUS FOR SUPPLYING OZONE FOR INTERNAL COMBUSTION ENGINES
Original Filed March 19, 1929
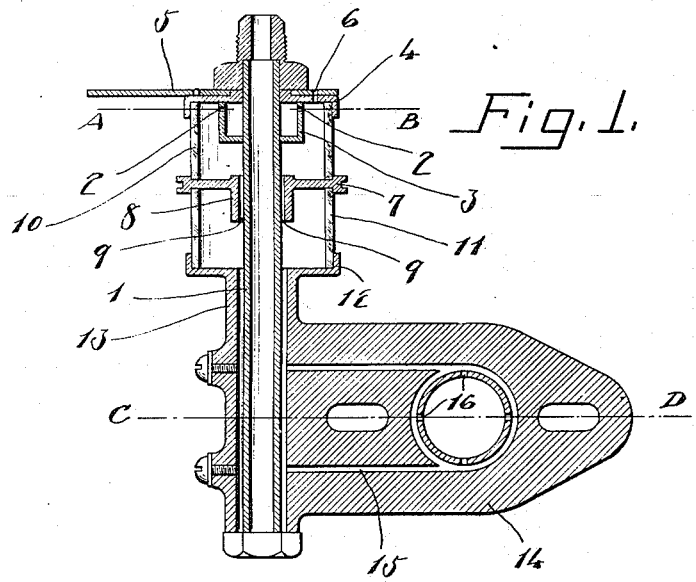
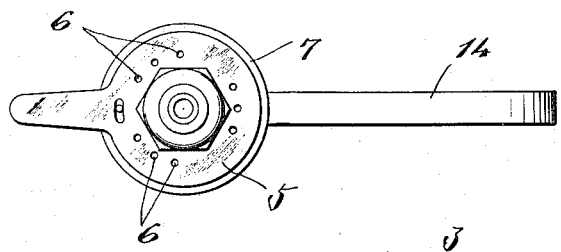
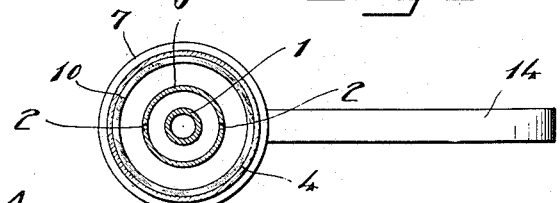
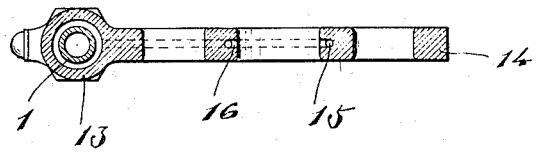
INVENTOR
Maung Sannyun.
By Lacy & Lacy,
Attys Patented May 22, 1934

1,959,738

UNITED STATES PATENT OFFICE 1,959,738

APPARATUS FOR SUPPLYING OZONE FOR INTERNAL COMBUSTION ENGINES

Maung San Nyun, Mishimagun, Osakafu, Japan, assignor to Iwao Fuchigami, Kobe City, Japan Application March 19, 1929, Serial No. 348,334
Renewed July 24, 1933

3 Claims. (Cl. 204—32)

This invention relates to an apparatus for supplying ozone for internal combustion engines. The present apparatus is positioned in between the carburettor and the cylinder in an internal combustion engine and has the function of converting the oxygen in the air into ozone through the medium of mercury and electric sparks. The ozone thus produced is mixed with fuel oil and carried into the combustion chamber, wherein it is decomposed to oxygen in nascent state by the combustion heat. Thus the complete combustion of fuel oil can be accomplished through the action of oxygen in nascent state.

In the accompanying drawing, Fig. 1 is a sectional elevation of an apparatus according to this invention, Fig. 2 is a plan view of the same, Fig. 3 is a section through the line A—B in Fig. 1, and Fig. 4 is a section through the line C—D in Fig. 1.

1 is a pipe adapted to be heated at about 280°-300° C. by the heat of waste gas, electrical or other suitable means. A reservoir for mercury 3 is provided around the upper part of the pipe 1. Small holes 2 are provided in the wall of said reservoir 3. 4 is a lid plate and another plate 5 is placed upon it. Each of the plates 4 and 5 is provided with equal number of holes 6 so that, if the plate 5 is turned, the apertures formed by each two corresponding holes 6 may be varied so as to regulate the quantity of the air to be sucked in. The mercury in the reservoir 3 is converted to mercurous oxide through combining with the oxygen existing in the air by heating. Said mercurous oxide is then reduced by further heating and sets oxygen free. The oxygen thus obtained will be carried with the air through the space 9 between the pipe 1 and the tube 8 fixed to a metal partition 7 at the sucking stroke of the piston. Said partition is insulated from the lid plate 4 and the bottom plate 12 through glass tubes 10 and 11. The metal partition 7 and the bottom plate 12 are connected to any suitable means for generating alternating current at a high voltage so that the current at high voltage passes through the partition 7 and the inner pipe 1, hence sparks are generated between them.

Thus, oxygen is readily converted to ozone while it is passing through the space formed between the partition 7 and the inner pipe 1. Then the mixture of air and the ozone passes through the spaces between the inner and the outer pipes 1 and 13, and through the passages 15 provided in the attaching plate 14, to small holes 16. Said holes 16 communicate with the passage between the carburettor and the cylinder and the mixture of air and ozone issuing from them is mixed with the fuel oil from the carburettor and passes into the cylinder. The ozone decomposes to oxygen in nascent state in the cylinder by the combustion heat and through the action of said oxygen the perfect working of the engine can be accomplished as above mentioned.

Having now particularly described and ascertained the nature of my said invention, and in what manner the same is to be performed, I declare that what I claim is:

1. An apparatus for supplying ozone to internal combustion engines including a heating pipe, a cup containing mercury adjacent and exposed to the heat from said pipe, a casing of insulation around said pipe and cup and in communication with the interior of the cup, means for admitting air to the casing adjacent the cup, a metal partition in the casing between the ends thereof and spaced from the heating pipe, a metal plate at the end of the casing remote from the cup, said plate and partition forming electric terminals, and a supporting element for mounting the apparatus adjacent the internal combustion engine and having passages leading from the casing to the intake of the engine.

2. An apparatus for supplying ozone to an internal combustion engine including a heater, a mercury container exposed to heat therefrom, means for effecting a circulation of air past said container and along the heater, and means for forming a spark gap in the path of the air beyond the container.

3. An apparatus for supplying ozone to an internal combustion engine including a heating pipe, a cup mounted on the pipe and having openings through its sides, a body of mercury held by said cup, a casing of insulation around the pipe and the cup, a lid extending over the upper ends of the cup and the casing, means on the lid for admitting a regulated supply of air to the casing, a metal partition in the casing having a tubular portion encircling the pipe in spaced relation thereto, and a metal bottom to the casing in spaced relation to the heating pipe defining a passage for ozonized air, said partition and said bottom constituting terminals of an electric circuit.

MAUNG SAN NYUN.